UNITED STATES PATENT OFFICE.

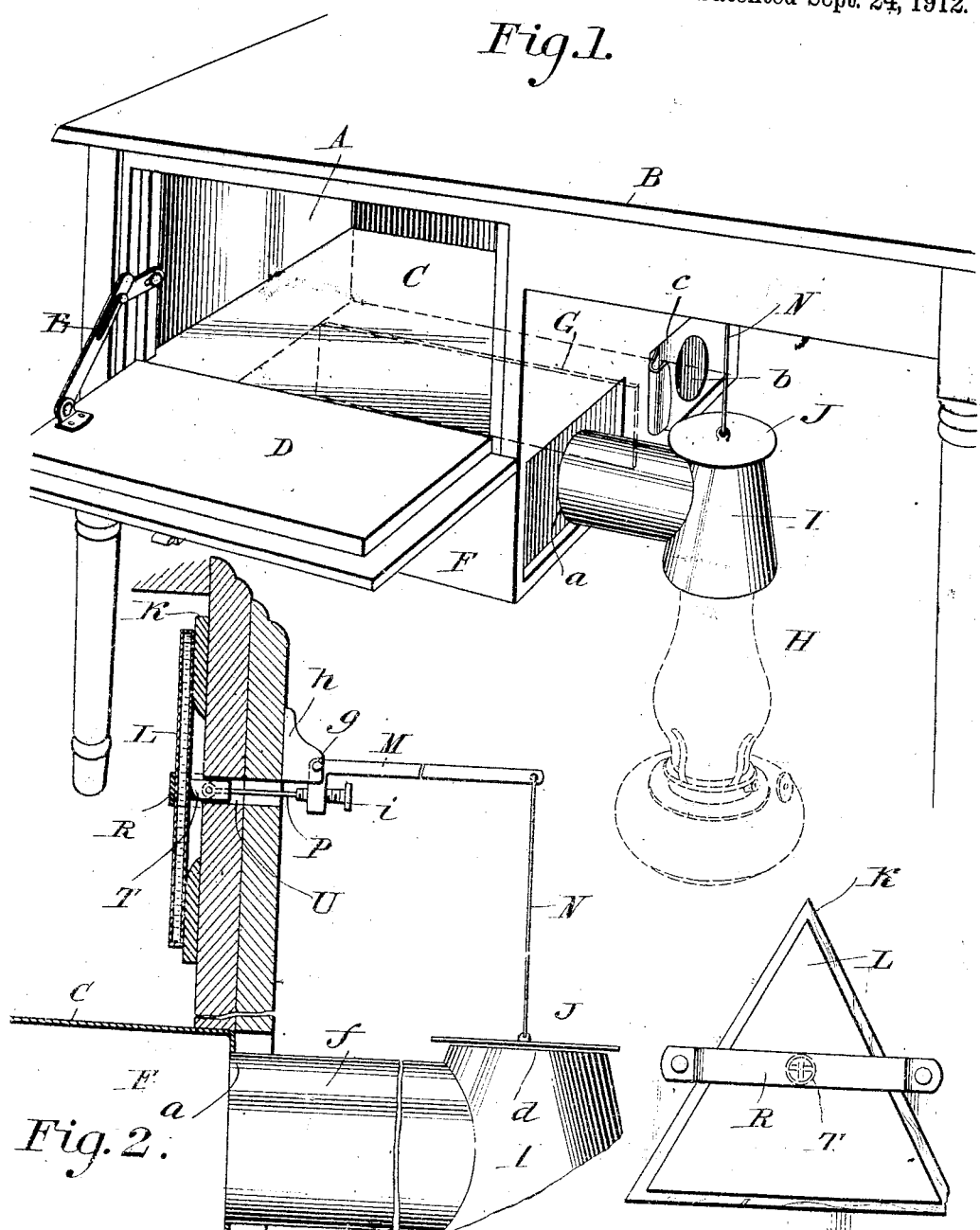

FRANK T. LEMBKE, OF GRAND FORKS, NORTH DAKOTA.

DOUGH-RAISER.

1,039,551.

Specification of Letters Patent.   Patented Sept. 24, 1912.

Application filed February 3, 1912. Serial No. 675,827.

*To all whom it may concern:*

Be it known that I, FRANK T. LEMBKE, a citizen of the United States, residing at Grand Forks, in the county of Grand Forks and State of North Dakota, have invented new and useful Improvements in Dough-Raisers, of which the following is a specification.

My present invention pertains to dough raisers of the lamp type; and it consists in the peculiar and advantageous construction whereby the interior of the raiser is maintained in a heated state and undue heating of the interior and the dough therein is effectually prevented in an automatic manner.

The invention will be fully understood from the following description and claim when the same are read in connection with the drawings accompanying and forming part of this specification, in which:

Figure 1 is a perspective view illustrating my novel raiser with the door of the dough chamber in open position. Fig. 2 is an enlarged detail view, partly in elevation and partly in section, showing the means for automatically regulating the heat within the said chamber. Fig. 3 is a detail elevation on a reduced scale, taken at a right angle to Fig. 2 and showing the expansible member of the heat-regulating means and the open frame and the bar between which the said member is interposed.

Similar letters of reference designate corresponding parts in all of the views of the drawings.

In the present and preferred embodiment of my invention, the dough-receiving chamber A of the raiser is connected with and forms a permanent part of a table B. The bottom of the said chamber A is formed by a sheet-metal wall C, and access is gained to the chamber through the door opening shown in Fig. 1, and designed when the raiser is in use, to be closed by the door D that is equipped with a suitable hanger E for maintaining it in a horizontal position.

Below the bottom C of the chamber A is arranged a hot-air chamber F. This hot-air chamber is divided into longitudinal portions by a longitudinal partition wall G which extends from one end wall of the chamber to a point adjacent the opposite end wall thereof, as shown by dotted lines in Fig. 1. By virtue of this provision the hot-air which enters the chamber F at the point *a* is caused to traverse the full length of the chamber, whereupon it passes the end of the partition wall G and then moves to the opposite end of the chamber where it escapes through an opening *b*. The said opening *b* may be increased or diminished in size by a damper *c*, as occasion demands.

A lamp H is employed to supply the necessary heat for the raiser, and over the chimney of the said lamp is arranged a hood I that is open at its upper end *d* and is connected through a tube *f* with the before-described opening *a*. Under some conditions the upper end *d* of the hood I is closed by a disk J, and hence the heated air received in the hood from the lamp chimney will be conducted into the heating chamber F of the raiser.

With a view to effectually preventing undue heating of the chamber A, I provide the simple and reliable means shown in Figs. 2 and 3, in combination with the disk J. The said means comprises an open frame K, preferably of triangular form, an expansible member L, preferably of triangular form, arranged in the chamber A and opposed to the frame K, a bell-crank M fulcrumed at *g* in a bracket *h* on the outer side of the raiser, a cable N connecting the long arm of the bell crank and the disk J, and a rod P effecting connection between the short arm of the bell crank and the adjacent wall of the expansible member; the said rod P being preferably connected to the short arm of the bell-crank through the medium of a regulating screw *i* which is threaded through the bell-crank arm and is connected in a swiveled manner to the outer end of the rod P.

The expansible member L of my novel heat-regulating means is made hollow and with thin walls, and is designed to be filled with a liquid which expands when heated. The said member L is arranged flat against the open frame K and snugly between said frame and a strap R that extends across the expansible member and is fixedly connected at its ends to the frame K, as best shown in Fig. 3. By virtue of this construction it will be manifest that expansion of the member L toward the chamber A is effectually prevented, and hence said member can only expand through the opening in the frame K. When the outer wall of the expansible member is protruded outward through the opening in the frame K, the disk J will be raised from the hood I, whereupon the hot air received in the hood I from the lamp chimney H will pass directly through the hood to the atmosphere. Then when the temperature within the chamber A is lowered to a predetermined extent, the contraction of the outer wall of the expansible member L will restore the disk or lid J to its position on the hood I, whereupon the heated air will pass, as in the first instance, from the hood I through the tube $f$ and the chamber F, in the manner before described.

In the present and best practical embodiment of my invention of which I am cognizant, the rod P is not connected directly to the outer wall of the expansible member L, but on the other hand is arranged in and connected to a tube T, which is fixed to and extends outward from the said outer wall and is guided in an aperture in the end wall of the chamber A. The connection of the rod P to the tube T is preferably a pivotal one as shown, and hence the said connection is not only strong and durable, but is calculated to assure movement of the bell-crank M and the lid or disk J when the member L is expanded. It will also be gathered that the heat regulating means as a whole is simple and inexpensive and is also reliable in operation.

When desired, the plate shown in Figs. 1 and 2, which plate carries the tube $f$, may be made slidable alongside a fixed plate provided with an aperture. Hence when the tube $f$ is in registration with the aperture in the fixed plate, hot air can pass from the tube $f$ into chamber F. Also when the tube $f$ and the plate by which it is carried are moved, the fixed plate will close communication between the tube $f$ and the chamber F. With this done and the damper $c$ also closed, hot air will be retained in the chamber F. The said damper constructions may be of any approved type and hence I have deemed it unnecessary to show the apertured plate with which the tube $f$ and the plate which carries said tube coöperate.

Having described my invention, what I claim and desire to secure by Letters-Patent, is:

The combination of a body having a chamber and an opening in one wall of the chamber, a lamp for heating the chamber, an open frame arranged within the chamber and surrounding said opening, a hollow expansible member opposed to the inner side of said frame and adapted to contain an agent that will expand when subjected to heat, a bar fixed against the opposite side of the expansible member, with reference to the open frame, a tube fixed to the outer wall of the expansible member and disposed in the opening in the wall of the chamber, a suitably supported bell crank, a connection extending through the said opening and between one arm of the bell crank and the tube on the outer wall of the expansible member, and means connected with the other arm of the bell-crank for controlling the heating of the chamber by the lamp.

In testimony whereof I have hereunto set my hand in presence of two subscribing witnesses.

FRANK T. LEMBKE.

Witnesses:
  H. A. BRONSON,
  ARNE VINJE.